(12) United States Patent
White et al.

(10) Patent No.: US 11,297,180 B2
(45) Date of Patent: *Apr. 5, 2022

(54) METHOD AND SYSTEM FOR PROVIDING ADDITIONAL INFORMATION TO CALLED PARTIES

(71) Applicant: FIRST ORION CORP., North Little Rock, AR (US)

(72) Inventors: James N. White, Dallas, TX (US); Monica Rose Martino, Plano, TX (US); M. Gregory Smith, Fairview, TX (US); Thomas M. Buie, Richardson, TX (US)

(73) Assignee: FIRST ORION CORP., North Little Rock, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/081,966

(22) Filed: Oct. 27, 2020

(65) Prior Publication Data

US 2021/0044695 A1 Feb. 11, 2021

Related U.S. Application Data

(63) Continuation of application No. 16/660,567, filed on Oct. 22, 2019, now Pat. No. 10,819,846, which is a continuation of application No. 16/209,913, filed on Dec. 4, 2018, now Pat. No. 10,455,083, which is a continuation of application No. 15/615,240, filed on Jun. 6, 2017, now Pat. No. 10,148,813, which is a continuation of application No. 14/948,344, filed on Nov. 22, 2015, now Pat. No. 9,674,346, which is a continuation of application No. 14/531,651, filed on Nov. 3, 2014, now Pat. No. 9,197,740, which is a continuation of application No. 12/070,364, filed on Feb. 15, 2008, now Pat. No. 8,879,702, which is a (Continued)

(51) Int. Cl.
| | |
|---|---|
| *H04M 1/56* | (2006.01) |
| *H04M 15/06* | (2006.01) |
| *H04M 3/42* | (2006.01) |
| *H04W 4/16* | (2009.01) |

(52) U.S. Cl.
CPC ... *H04M 3/42059* (2013.01); *H04M 3/42042* (2013.01); *H04W 4/16* (2013.01)

(58) Field of Classification Search
None
See application file for complete search history.

(56) References Cited

U.S. PATENT DOCUMENTS

| | | |
|---|---|---|
| 5,165,095 A | 11/1992 | Borcherding |
| 5,311,569 A | 5/1994 | Brozovich et al. |
| 5,651,055 A | 7/1997 | Argade |

(Continued)

*Primary Examiner* — Quoc D Tran

(57) ABSTRACT

A system for providing additional information to called parties, the system comprises a base unit device for sending additional information to called parties, the base unit comprises a microprocessor, at least one Ethernet port, at least one telephone port, a first transceiver, and a first wireless antenna; and a display unit for receiving the additional information from the base unit device and displaying the additional information to the called parties, the display unit comprises a second transceiver, a liquid crystal display, a second wireless antenna, and a set of keys.

20 Claims, 16 Drawing Sheets

Related U.S. Application Data continuation of application No. 11/974,983, filed on Oct. 17, 2007, now Pat. No. 8,625,762.

(60) Provisional application No. 60/934,407, filed on Jun. 13, 2007.

(56) References Cited

U.S. PATENT DOCUMENTS

| | | |
|---|---|---|
| 5,970,143 A | 10/1999 | Schneier et al. |
| 6,014,426 A | 1/2000 | Drysdale et al. |
| 6,240,175 B1 | 5/2001 | Barber |
| 6,298,128 B1 | 10/2001 | Ramey et al. |
| 6,341,161 B1 | 1/2002 | Latter et al. |
| 6,353,664 B1 | 3/2002 | Cannon et al. |
| 6,459,782 B1 | 10/2002 | Bedrosian et al. |
| 6,496,569 B2 | 12/2002 | Pelletier et al. |
| 6,539,080 B1 | 3/2003 | Bruce et al. |
| 6,608,886 B1 | 8/2003 | Contractor |
| 6,658,455 B1 | 12/2003 | Weinman |
| 6,721,406 B1 | 4/2004 | Contractor |
| 6,920,206 B2 | 7/2005 | Basore et al. |
| 6,940,954 B1 | 9/2005 | Toebes |
| 6,950,504 B1 | 9/2005 | Marx et al. |
| 6,970,543 B2 | 11/2005 | Lautenschlager et al. |
| 7,024,556 B1 | 4/2006 | Hadjinikitas et al. |
| 7,127,237 B2 | 10/2006 | Naruse et al. |
| 7,200,212 B2 | 4/2007 | Gosselin |
| 7,248,677 B2 | 7/2007 | Randall et al. |
| 7,269,413 B2 | 9/2007 | Kraft |
| 7,840,689 B2 | 11/2010 | Stewart |
| 7,864,940 B1 | 1/2011 | Harvey et al. |
| 7,869,792 B1 | 1/2011 | Zhou et al. |
| 7,899,921 B2 | 3/2011 | Hill et al. |
| 8,005,195 B2 | 8/2011 | Luneau et al. |
| 8,068,825 B2 | 11/2011 | Mikan et al. |
| 8,081,992 B2 | 12/2011 | Book |
| 8,095,647 B2 | 1/2012 | Stewart |
| 8,099,780 B2 | 1/2012 | Lu |
| 8,103,868 B2 | 1/2012 | Christensen |
| 8,199,733 B2 | 6/2012 | Stewart |
| 8,250,204 B2 | 8/2012 | Stewart |
| 8,255,539 B2 | 8/2012 | Pierlot et al. |
| 8,295,819 B1 | 10/2012 | Kaplan et al. |
| 8,300,787 B2 | 10/2012 | Frank |
| 8,331,899 B2 | 12/2012 | Broms |
| 8,417,763 B2 | 4/2013 | Stewart |
| 8,437,460 B2 | 5/2013 | Daniell et al. |
| 8,447,018 B2 | 5/2013 | Martino et al. |
| 8,548,140 B2 | 10/2013 | Martino et al. |
| 8,861,697 B2 | 10/2014 | Martino et al. |
| 8,879,702 B1 | 11/2014 | White et al. |
| 9,008,292 B2 | 4/2015 | Martino et al. |
| 9,036,797 B2 | 5/2015 | Martino et al. |
| 9,197,740 B2 | 11/2015 | White et al. |
| 9,392,107 B2 | 7/2016 | Martino et al. |
| 9,496,569 B2 | 11/2016 | Gangwar |
| 9,497,306 B2 | 11/2016 | Martino et al. |
| 9,674,346 B2 | 6/2017 | White et al. |
| 9,838,535 B2 | 12/2017 | Martino et al. |
| 10,091,342 B2 | 10/2018 | Martino et al. |
| 10,148,813 B2 * | 12/2018 | White ............... H04W 4/16 |
| 10,257,348 B2 | 4/2019 | White et al. |
| 10,262,281 B1 | 4/2019 | Vitek et al. |
| 10,397,387 B2 | 8/2019 | Martino et al. |
| 10,455,083 B2 | 10/2019 | White et al. |
| 10,805,446 B2 | 10/2020 | Martino et al. |
| 10,819,846 B2 * | 10/2020 | White ............... H04W 4/16 |
| 2002/0018546 A1 | 2/2002 | Horne |
| 2002/0057764 A1 | 5/2002 | Salvucci et al. |
| 2002/0067807 A1 | 6/2002 | Danner et al. |
| 2002/0120505 A1 | 8/2002 | Henkin et al. |
| 2002/0172336 A1 | 11/2002 | Postma et al. |
| 2003/0027559 A1 | 2/2003 | Umstetter et al. |
| 2003/0086558 A1 | 5/2003 | Seelig et al. |
| 2003/0112938 A1 | 6/2003 | Kanakubo et al. |
| 2003/0128821 A1 | 7/2003 | Luneau et al. |
| 2003/0144876 A1 | 7/2003 | Kosinski et al. |
| 2003/0177347 A1 | 9/2003 | Schneier et al. |
| 2003/0198323 A1 | 10/2003 | Watanabe |
| 2004/0044912 A1 | 3/2004 | Connary et al. |
| 2004/0067751 A1 | 4/2004 | Vandermeijden et al. |
| 2004/0096042 A1 | 5/2004 | Orwick et al. |
| 2004/0148342 A1 | 7/2004 | Cotte |
| 2004/0228456 A1 | 11/2004 | Glynn et al. |
| 2004/0261126 A1 | 12/2004 | Addington et al. |
| 2005/0074109 A1 | 4/2005 | Hanson et al. |
| 2005/0084085 A1 | 4/2005 | Silver et al. |
| 2005/0160144 A1 | 7/2005 | Bhatia |
| 2005/0198099 A1 | 9/2005 | Motsinger et al. |
| 2005/0240432 A1 | 10/2005 | Jensen |
| 2005/0243975 A1 | 11/2005 | Reich et al. |
| 2005/0286687 A1 | 12/2005 | Sanmugasuntharam et al. |
| 2005/0286691 A1 | 12/2005 | Taylor et al. |
| 2006/0025112 A1 | 2/2006 | Hamanaga et al. |
| 2006/0026277 A1 | 2/2006 | Sutcliffe |
| 2006/0031553 A1 | 2/2006 | Kim |
| 2006/0072713 A1 | 4/2006 | Fernandes et al. |
| 2006/0085519 A1 | 4/2006 | Goode et al. |
| 2006/0123119 A1 | 6/2006 | Hill et al. |
| 2006/0166658 A1 | 7/2006 | Bennett et al. |
| 2006/0184684 A1 | 8/2006 | Weiss et al. |
| 2006/0293057 A1 | 12/2006 | Mazerski et al. |
| 2006/0294465 A1 | 12/2006 | Ronen et al. |
| 2007/0033419 A1 | 2/2007 | Kocher et al. |
| 2007/0064886 A1 | 3/2007 | Chiu et al. |
| 2007/0071201 A1 | 3/2007 | Pettus et al. |
| 2007/0127656 A1 | 6/2007 | Citron et al. |
| 2007/0133771 A1 | 6/2007 | Stifelman et al. |
| 2007/0154009 A1 | 7/2007 | Cameron et al. |
| 2007/0195942 A1 | 8/2007 | Woodring |
| 2007/0206736 A1 | 9/2007 | Sprigg et al. |
| 2007/0207781 A1 | 9/2007 | Sprigg et al. |
| 2007/0248221 A1 | 10/2007 | Chatterjee et al. |
| 2007/0271596 A1 | 11/2007 | Boubion et al. |
| 2007/0280445 A1 | 12/2007 | Shkedi |
| 2008/0005325 A1 | 1/2008 | Wynn et al. |
| 2008/0070609 A1 | 3/2008 | Ackley |
| 2008/0084975 A1 | 4/2008 | Schwartz |
| 2008/0091796 A1 | 4/2008 | Story et al. |
| 2008/0101298 A1 | 5/2008 | Tasker |
| 2008/0140714 A1 | 6/2008 | Rhoads et al. |
| 2008/0159318 A1 | 7/2008 | Pierlot et al. |
| 2008/0177616 A1 | 7/2008 | Nemirofsky et al. |
| 2008/0246605 A1 | 10/2008 | Pfeffer et al. |
| 2008/0260135 A1 | 10/2008 | Siegrist |
| 2009/0234578 A1 | 9/2009 | Newby et al. |
| 2011/0007885 A1 | 1/2011 | Kirchhoff et al. |
| 2011/0013755 A1 | 1/2011 | Martino et al. |
| 2011/0087744 A1 | 4/2011 | Deluca et al. |
| 2011/0105091 A1 | 5/2011 | Jones |
| 2012/0226756 A1 | 9/2012 | Lindquist et al. |
| 2012/0230479 A1 | 9/2012 | Martin |
| 2012/0243675 A1 | 9/2012 | Diroo et al. |
| 2014/0003589 A1 | 1/2014 | Martino et al. |
| 2014/0122506 A1 | 5/2014 | Jebara et al. |
| 2014/0282759 A1 | 9/2014 | Harvey et al. |

\* cited by examiner

| U | n | p | l | u | g |   | a | n | d |   |   |   |
|---|---|---|---|---|---|---|---|---|---|---|---|---|
| r | e | - | p | l | u | g |   | p | o | we | r |   | t | o |
| B | a | s | e | Un | i | t |   | t | o |   |   |   |
| c | h | a | n | g | e |   | c | h | a | n | n | e | l | s | . |

| C | u | r |   | C | h | a | n | n | e | l | # | : | E |   |
|   |   | C | h | a | n | g | e |   | t | o |   | # | ? |   |
| ( | UP | / | DN | , | t | h | e | n |   | " | E | " | ) |   |
| 0 | 1 | 2 | 3 | 4 | 5 | 6 | 7 | 8 | 9 | A | B | C | D | E | F |

1406 —

METHOD AND SYSTEM FOR PROVIDING ADDITIONAL INFORMATION TO CALLED PARTIES

CROSS-REFERENCE TO RELATED APPLICATIONS

This application is a continuation of U.S. patent application Ser. No. 16/660,567, filed on Oct. 22, 2019, now U.S. Pat. No. 10,819,846, issued on Oct. 27, 2020, which is a continuation of U.S. patent application Ser. No. 16/209,913, filed on Dec. 4, 2018, now U.S. Pat. No. 10,455,083, issued on Oct. 22, 2019, which is a continuation of U.S. patent application Ser. No. 15/615,240, filed on Jun. 6, 2017, now U.S. Pat. No. 10,148,813, issued on Dec. 4, 2018, which is a continuation of U.S. patent application Ser. No. 14/948,344, filed on Nov. 22, 2015, now U.S. Pat. No. 9,674,346, issued on Jun. 6, 2017, which is a continuation of U.S. patent application Ser. No. 14/531,651, filed on Nov. 3, 2014, now U.S. Pat. No. 9,197,740, issued on Nov. 24, 2015, which is a continuation of U.S. patent application Ser. No. 12/070,364, filed on Feb. 15, 2008, now U.S. Pat. No. 8,879,702, issued on Nov. 4, 2014, which is a continuation of U.S. patent application Ser. No. 11/974,983, filed on Oct. 17, 2007, now U.S. Pat. No. 8,625,762, issued on Jan. 7, 2014, which claims priority to U.S. Provisional Patent Application No. 60/934,407, filed on Jun. 13, 2007, the entire disclosures of which are incorporated by reference herein.

FIELD OF THE INVENTION

The present disclosure is generally related to a communications network, and more particularly to a system for providing additional information to called parties in a communications network.

BACKGROUND OF THE INVENTION

Automatic Number Identification (ANI) is a system utilized by telephone companies to identify the Directory Number (DN) of a calling subscriber. ANI serves a function similar to Caller ID, but may utilize different underlying technology. ANI was originally developed for telephone company billing purposes and is now offered to commercial customers who may benefit from knowing who is calling them. In addition, ANI is one of the core technologies behind the 911 emergency service.

In commercial applications, a user may have an integrated or extraneous display affixed to a telephone. Such a display presents the ANI or telephone number of the calling party. In addition, the display may present the caller's name or calling name, also known as CNAM. As such, what is needed is a system that can provide additional information to called parties.

SUMMARY OF THE INVENTION

A system for providing additional information to a called party in a communications network is provided. The system comprises a base unit device for sending additional information to called parties, the base unit comprises a microprocessor, at least one Ethernet port, at least one telephone port, a first transceiver, and a first wireless antenna; and a display unit for receiving the additional information from the base unit device and displaying the additional information to the called parties, the display unit comprises a second transceiver, a liquid crystal display, a second wireless antenna, and a set of keys.

Alternatively, the system comprises a display unit for displaying additional information received from a base unit device to called parties, the display unit comprises a liquid crystal display operable to display at least one alphanumeric character, a "UP" key, a "DN" key, and a "E" key.

A method for providing additional information to a called party is provided. The method comprises performing a set up of a display unit using a combination of at least one of a "UP" key, a "DN" key, and a "E" key of the display unit, performing a test for connection between the display unit and a base unit device based on a base unit address configured using a combination of at least one of a "UP" key, a "DN" key, and a "E" key of the display unit, performing a test for communication between the display unit and a database, and displaying the additional information on a liquid crystal display of the display unit in a message, the additional information comprising a phone number of a calling party, a name of the calling party, a message for a called party, a date of the call, and a time of the call.

BRIEF DESCRIPTION OF THE DRAWINGS

FIG. 14A depicts a diagram illustrating displaying a message notifying the user to unplug and re-plug the power to device 102 in accordance with one embodiment of the present disclosure; and FIG. 14B depicts a diagram illustrating entering a new channel in accordance with one embodiment of the present disclosure.

DETAILED DESCRIPTION OF THE INVENTION

The present disclosure provides a system for providing additional information to a called party or called parties. In the context of the present disclosure, a calling party is a party initiating or sending a call. A called party is a party receiving the call. The called party and the calling party each use at least one electronic device. The present disclosure is initiated when the called party is able to receive an ANI and is able to display related information to such a service or to a related service.

Figure 1:
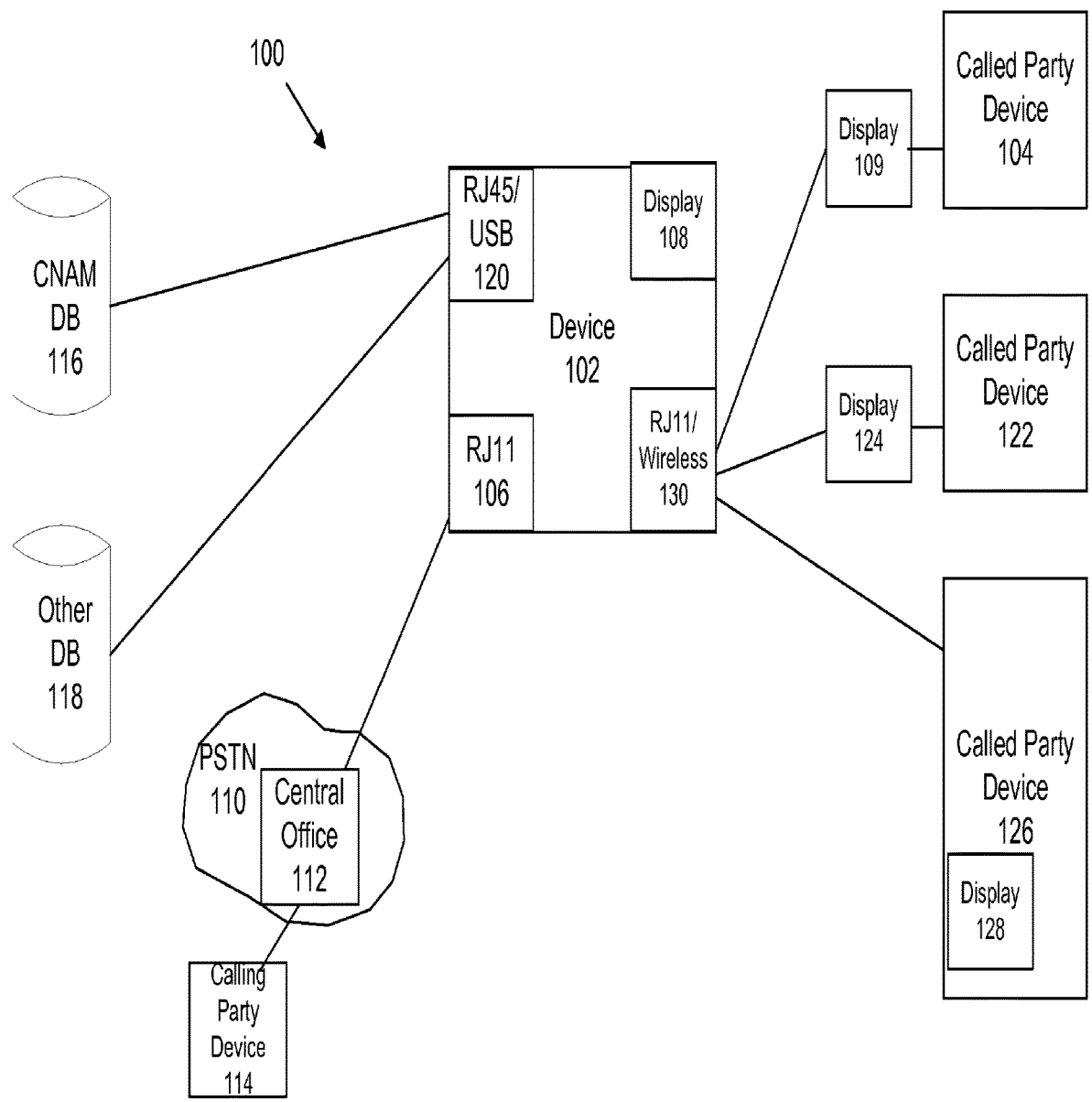
FIG. 1 depicts a system for providing additional information to called parties in accordance with one embodiment of the present disclosure.

FIG. 1 depicts a system 100 for providing additional information to called parties in accordance with one embodiment of the present disclosure. System 100 includes a device 102, which is able to send information to a called party device 104. Called party device 104 may be communicably coupled to device 102 via an RJ11 (telephone wire) port or a wireless port 130 and is able to display information on a display 108. In this embodiment, the display 108 is integrated within device 102. However, display 108 may be implemented as a standalone device without departing from the spirit and scope of the present disclosure. Further, the device 102 may be connected to the one or more displays via a wired and/or wireless connection.

In addition, device 102 may receive information from a plurality of sources including public switched telephone network (PSTN) 110 which includes a central office 112 which is coupled to a calling party device 114. The information may be received by a RJ11 (telephone wire) port 106 of device 102. Other sources include a wireless network or data network (not shown) supporting other devices such as a computer or IP enabled phones. Currently, information received by device 102 may include telephone number of the calling party and the calling party name (CNAM).

Aspects of the present disclosure provide additional information to called parties, such as called party device 104, by providing an ability to retrieve calling party information from a CNAM database 116 and/or other database 118. CNAM database 116 and other database 118 comprise information relating to the calling party, for example, calling party name, telephone number, messages, location, and other information associated with the calling party. In addition, the information relating to the calling party may be a name, a city, a state, an address, a hyperlink, a photo, a video, and any information that can be sent via an Internet Protocol connection. When a calling party initiates a call using calling party device 114, calling party device 114 sends an automatic number identification (ANI) or other identifier of the calling party to RJ11 (telephone wire) port 106 of device 102. An example of another identifier may include an IP address of the calling party device 114 or a unique identifier of the calling party that can be received and transmitted by the calling party device 114.

In response to receiving the ANI or other identifier, device 102 sends a query for the calling party name to CNAM database 116 and/or other database 118. The query may be sent via the RJ45 (Ethernet) port or a USB port 120 of device 102 to databases 116 or 118 via a direct connection or via a data network (not shown). Once the query is received, a lookup is performed in CNAM database 1 16 or other database 1 18 for the calling party name. If the calling party name is found, the CNAM database 116 or other database 118 returns the calling party name and additional information associated with the calling party to device 102. Upon receiving the information, device 102 may display it on display 108. Prior to performing the lookup, device 102 may first determine whether the called number is a paying subscriber. To determine if the subscriber is a paying subscriber, the CNAM database 1 16 or other database 118 may send information of the called number, including, the called party name, a credit card number, or a zipcode, to another database for verification. If the verification is acceptable, the CNAM database 112 or other database 114 then returns a response to the device 102.

In addition to displaying the information, device 102 may send the information to other called party devices, such as called party devices 104, 122, and 126, to be contemporaneously displayed on displays 109, 124, and 128 respectively. In this example, displays 109, 124, and 128 are implemented as standalone devices. In other embodiments, the displays 109, 124, and 128 can be communicably coupled to called party devices 104, 122, and 126 or may be integrated with called party devices 104, 122 and 126 without departing the spirit and scope of the present disclosure. For example, display 128 may be integrated as part of called party device 126 and device 102 may send information directly to called party device 126 to be displayed on display 128. The information may be sent from the RJ11

(telephone wire) port of device 102 or via wireless connection 130. However, if the calling name is not found, a lookup is performed in other databases (not shown) to determine where the ANI or identifier of the calling party is stored. Once the ANI or identifier is located, the calling party information may be provided to device 102.

Figure 2:
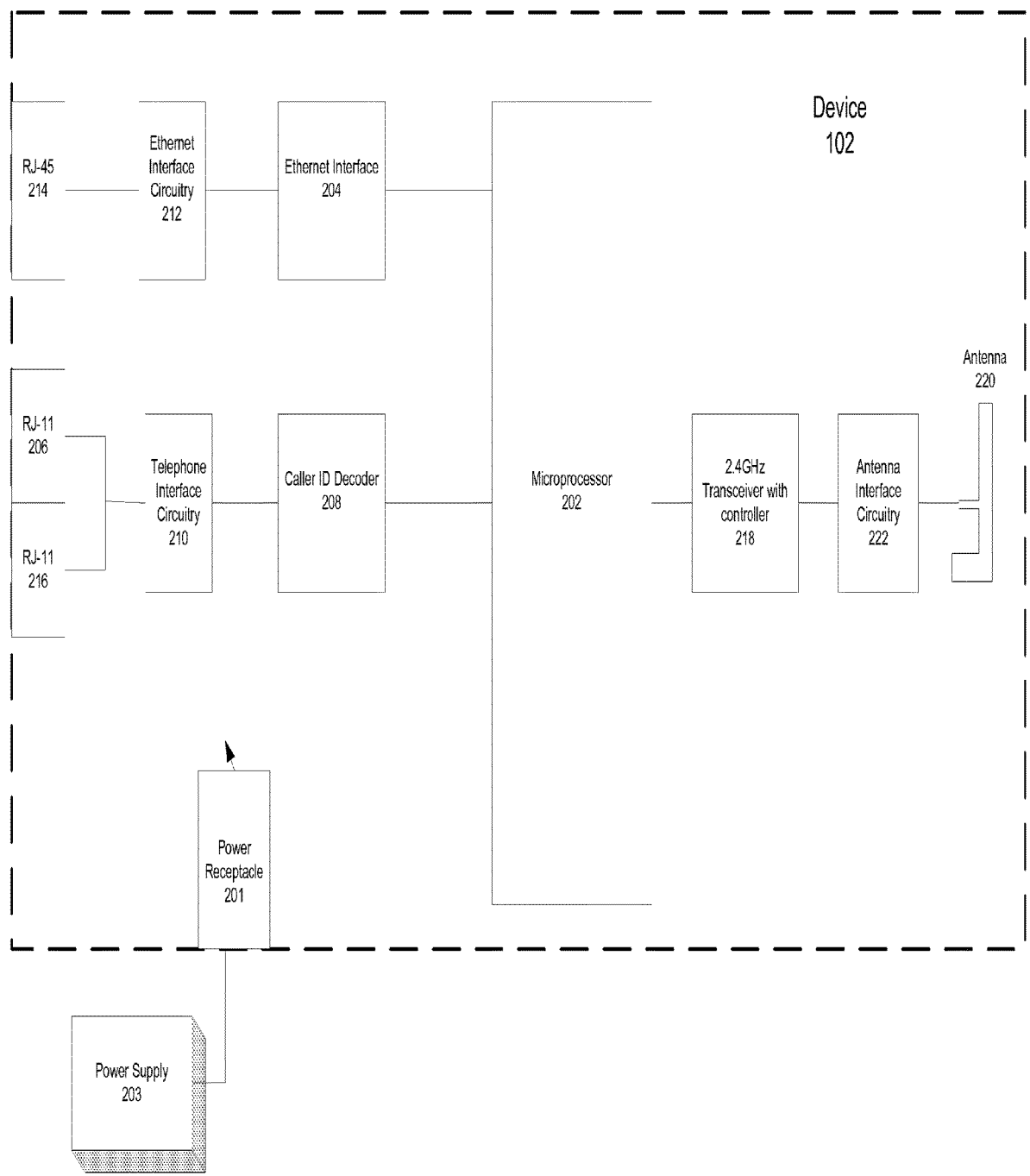
FIG. 2 depicts a diagram illustrating components of device 102 in accordance with one embodiment of the present disclosure.

Referring to FIG. 2, a diagram illustrating components of device 102 is depicted in accordance with one embodiment of the present disclosure. Device 102 comprises a power receptacle 201, which receives power from an external power supply 203. Device 102 also comprises a microprocessor 202, which controls operations for sending information to called parties and receiving information from calling party devices or databases. One example of microprocessor 202 may be a microprocessor implemented with ARM7 architecture. ARM7 architecture is optimized for cost and power-sensitive consumer applications. Microprocessor 202 comprises an internal Ethernet interface or communicates with Ethernet interface 204 to retrieve information from CNAM database 116 or other database 118.

To receive an ANI or identifier of the calling party from a calling party device, device 102 comprises an RJ-11 port 206, which upon receiving the identifier or ANI, sends the identifier or ANI to the caller ID decoder 208 via telephone Interface circuitry 210. The caller ID decoder 208 decodes the identifier or ANI and sends it to microprocessor 202 to be processed.

Upon receiving the identifier or ANI, microprocessor 202 sends a query to CNAM database 116 or other database 118 for the calling party name and additional information based on the received ANI or identifier. Microprocessor 202 sends the query from either an internal Ethernet interface or Ethernet interface 204 via an Ethernet interface circuitry 212 to the RJ-45 (Ethernet port) 214. RJ-45 port 214 in turn sends the query to CNAM database 116 or other database 118.

Upon receiving calling party name and additional information associated with the calling party or additional intended for the called party, RJ-45 port 214 forwards the calling party name and additional information to microprocessor 202. The information received at RJ-45 port 214 is sent via the Ethernet interface circuitry 212 to either an internal Ethernet interface of microprocessor 202 or Ethernet interface 204 before reaching microprocessor 202.

Once the information is received, microprocessor 202 may forward the information to other displays and/or called party devices. In one embodiment, microprocessor 202 may forward the information by sending the information to a caller ID decoder 208, which encodes the information in a format, utilized by other displays and/or called party devices. Caller ID decoder 208 then sends the encoded information to RJ-11 port 216 via telephone interface circuitry 210. RJ-11 port 216 in turn forwards the encoded information to other displays and/or called party devices.

In an alternative embodiment, microprocessor 202 may forward the information by sending the information via a wireless connection. In that case, the information is first sent to a radio frequency transceiver with controller 218 for wireless applications. RF transceiver with controller 218 then forwards the information to Antenna 220 via antenna interface circuitry 222. Radio frequency transceiver with controller 218 may handle a bandwidth of about 2.4 GHz. Upon receiving the information, antenna 220 then sends the information to other displays and/or called party devices via a wireless network.

Figure 3:
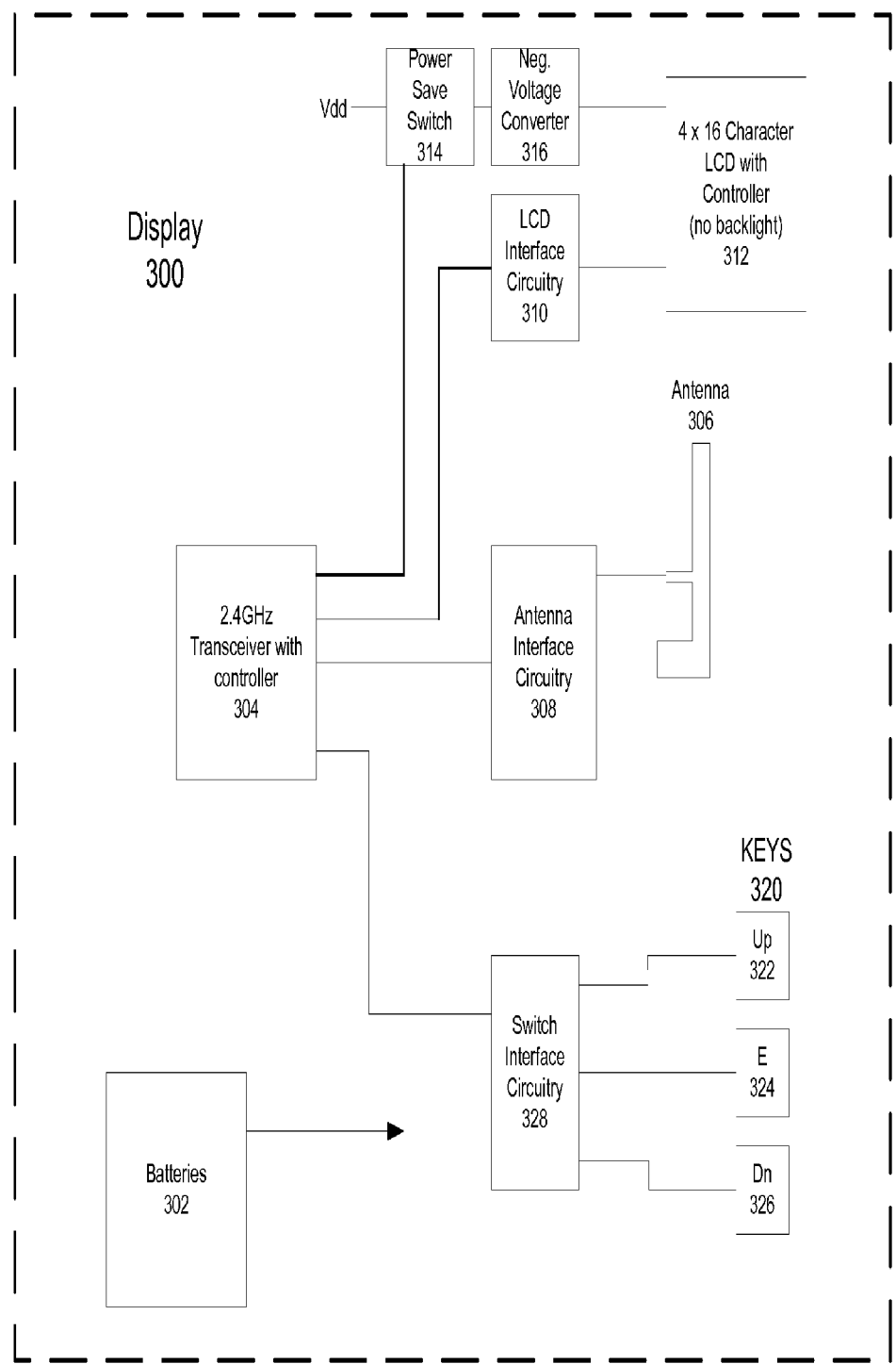
FIG. 3 depicts a diagram illustrating components of a called party device display in accordance with one embodiment of the present disclosure.

Referring to FIG. 3, a diagram illustrating components of a called party device display unit is depicted in accordance with one embodiment of the present disclosure. As discussed above, display 300 may be implemented as a standalone device or an integrated device with other called party devices. Alternatively, the device 300 may be implemented as a mobile device with functionalities of both device 102 and called party devices 104, 122, and 126.

Display 300 receives power from one or more batteries 302, which in one embodiment, are installed in a battery compartment of display 300. In addition, display 300 comprises a transceiver 304 for forwarding the information received to other components of display unit 300.

Display unit 300 also comprises an antenna 306 for receiving information in radio frequency signals from a wireless network Upon receiving the radio frequency signals, antenna 306 forwards the information to transceiver 304 via antenna interface circuitry 308. Transceiver 304 in turn sends the information via an LCD interface circuitry 310 to be displayed on a liquid crystal display (LCD) 312. In one implementation, LCD 312 may be a display capable of displaying 4×16 or 64 characters with no backlight. In addition, LCD 312 may comprise an internal controller. LCD 312 may be powered by batteries 302 via a power save switch 314 and a negative voltage converter 316 or other power sources not shown in this figure.

Display 300 also comprises a set of keys 320. In one embodiment, set of keys 320 comprises a "UP" key 322, a "E" key 324, and a "DN" key 326. Keys 320 provide users the ability to setup and operate the display 300. Selection of keys 320 are received by transceiver 304 via a switch interface circuitry 328. Thus, different configurations of keys 320 may be received by the transceiver 304 via the switch interface circuitry 328.

Figure 4:
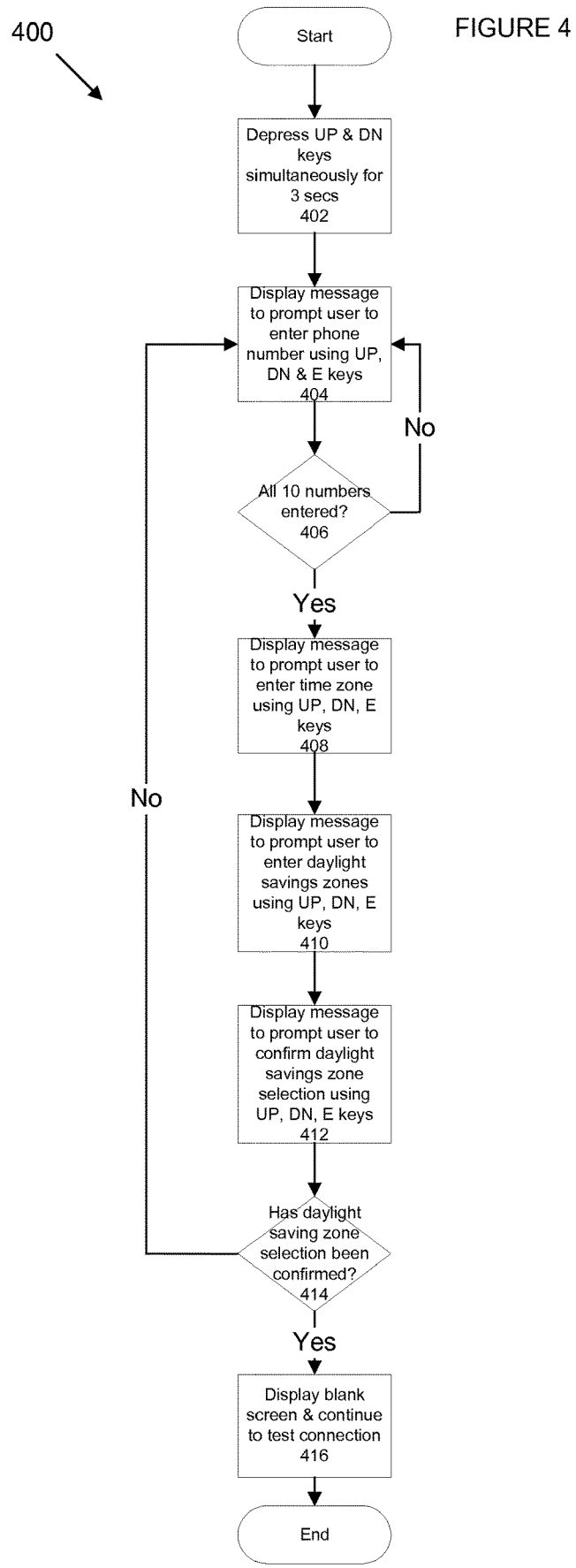
FIG. 4 depicts a flowchart of a method for performing setup of display 300 in accordance with one embodiment of the present disclosure.

Referring to FIG. 4, a flowchart of a method for performing setup of display 300 is depicted in accordance with one embodiment of the present disclosure. Process 400 begins at step 402 to depress the "UP" key and the "DN" key simultaneously for at least three seconds. It is noted that at any time during the set up process, the initial set up screen may be restarted by depressing "UP" key and the "DN" key simultaneously for at least three seconds.

Next, process 400 continues to step 404 to display a message on the LCD display prompting the user to enter a phone number by using the "UP" and "DN" keys to select a number and "E" key to enter once selection is complete. Process 400 then proceeds to step 406 to determine if all ten numbers are entered. If not all ten numbers are entered, the process 400 returns to step 404 to prompt the user for the next number. More details regarding entering a phone number using "UP", "DN", and "E" keys are discussed with reference to FIGS. 10A and 10B below.

However, if all ten numbers are entered, process 400 continues to step 408 to display a message on the LCD display prompting the user to enter a time zone using the "UP" and "DN" keys to select a time zone from available options and "E" key to enter once the selection is complete. More details regarding entering a time zone using "UP" "DN", and "E" keys are discussed with reference to FIG. 10C below.

After the time zone is entered, process 400 continues to step 410 to display a message on the LCD display prompting the user to enter a daylight savings zone by using the "UP" and "DN" keys to select a "Yes" or "No", and "E" key to enter the selection. More details regarding entering a daylight savings zone using "UP" "DN", and "E" keys are discussed with reference to FIG. 10D below.

After the daylight savings zone is entered, process 400 continues to step 412 to display a message on the LCD display prompting the user to confirm the daylight savings zone selection by using the "UP" and "DN" keys to select a "Yes" or "No", and the "E" key to enter the selection. More details regarding confirming a daylight savings zone using "UP", "DN", and "E" keys are discussed with reference to FIG. 10E below.

Process 400 then continues to step 414 to determine if the daylight savings zone selection has been confirmed. If the selection has been confirmed, process 400 continues to step 416 to display a blank screen on the LCD display and continue to test connection with device 102. If the selection has not been confirmed, process 400 returns to steps 404 to 412 to display messages prompting the user to enter the phone number, time zone, and daylight savings zone.

Figure 5:
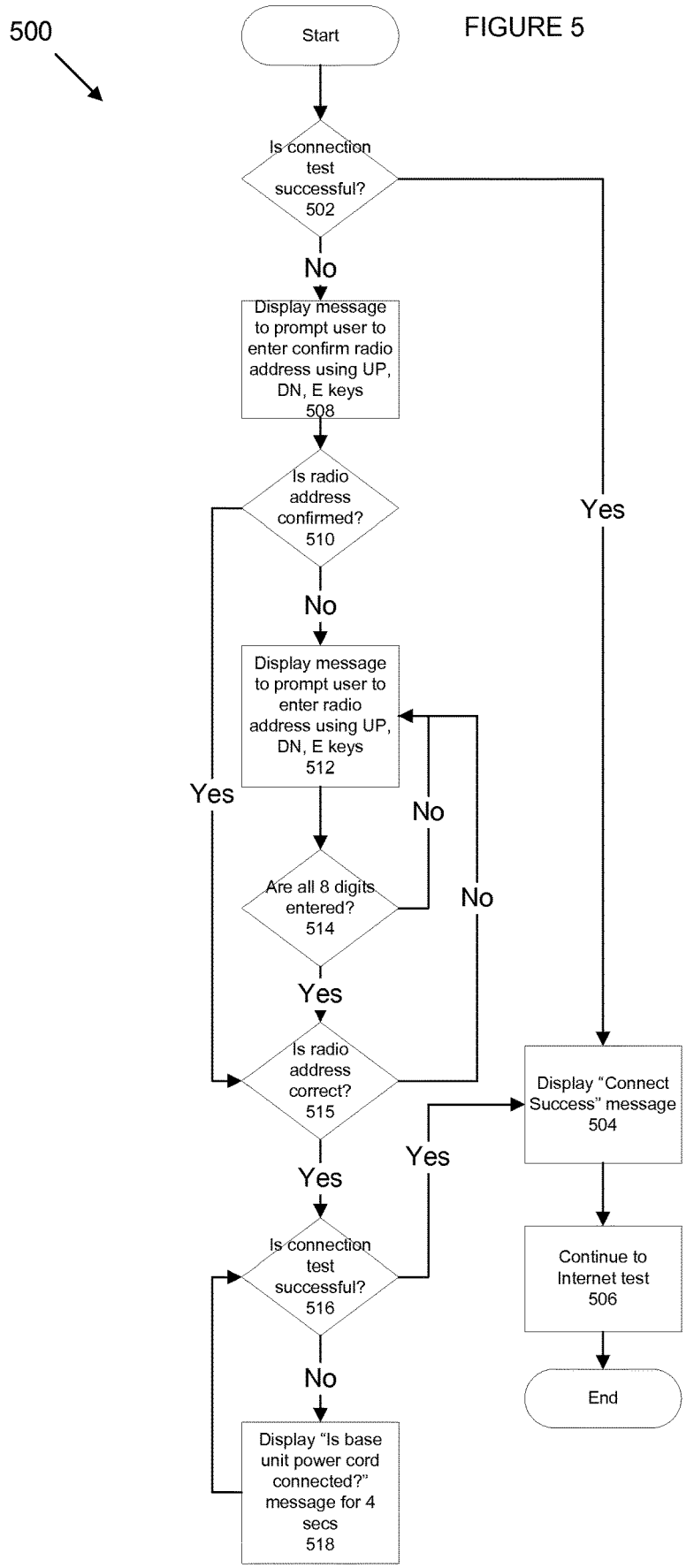
FIG. 5 depicts a flowchart of a method for performing a self test in accordance with one embodiment of the present disclosure.

After display 300 is set up successfully, the display 300 will perform a self test for connection with the device 102. Referring to FIG. 5, a flowchart of a method for performing a self test is depicted in accordance with one embodiment of the present disclosure. Process 500 begins at step 502 to determine if connection with the device 102 is successful.

If connection is successful, process 500 continues to step 504 to display a "Connect successful" message on the LCD display for at least two seconds and continues to step 506 to perform an Internet test. More details regarding displaying the "Connect Successful" message are discussed with reference to FIG. 11A below. However, if the connection is unsuccessful, process 500 continues to step 508 to display a "Connect Error" message on the LCD display prompting the user to confirm radio address attached to the barcode label of device 102 by using the "UP" and "DN" keys to select "Yes" or "No" and "E" key to enter the selection. More details regarding confirming radio address of device 102 using "UP" "DN", and "E" keys are discussed with reference to FIG. 11B below.

Process 500 then continues to step 510 to determine if the radio address is confirmed by the user. If the radio address is not confirmed, process 500 continues to step 516 to retry the connection and determine if the connection test is successful. However, if the radio address is not confirmed, process 500 continues to step 512 to display a message on the LCD display prompting the user to enter a radio address using the "UP" and "DN" key to select the numbers and "E" key to enter the selection. More details regarding entering radio address of device 102 using "UP", "DN", and "E" keys are discussed with reference to FIG. 11C below.

Process 500 then continues to step 514 to determine if all eight digits of the radio address is entered. If not all eight digits of the radio address are entered, the process 500 returns to step 512 to prompt the user to enter the remaining digits. If all eight digits of the radio address are entered, the process 500 continues to step 515 to prompt the user to confirm whether the radio address entered is correct. More details regarding confirming entry of radio address of device 102 using "UP" "DN" and "E" keys are discussed with reference to FIG. 11D below.

If the radio address entered is incorrect, process 500 returns to step 512 to prompting the user to reenter the address. If the radio address entered is correct, process 500 continues to step 516 to retry the connection and determine if the connection test is successful. If the connection test is successful, process 500 continues to step 504 to display the "Connect Success" message on the LCD display for at least two seconds and to step 506 to perform the Internet test. More details regarding displaying "Connect success" message are discussed with reference to FIG. 11F below.

However, if the connection test is unsuccessful, process 500 continues to step 518 to display a "Is base unit power cord connected?" message on the LCD display for at least four seconds and returns to step 516 to retry the connection until the connection is successful. More details regarding displaying "Is base unit power cord connected?" message are discussed with reference to FIG. 11E below.

Figure 6:
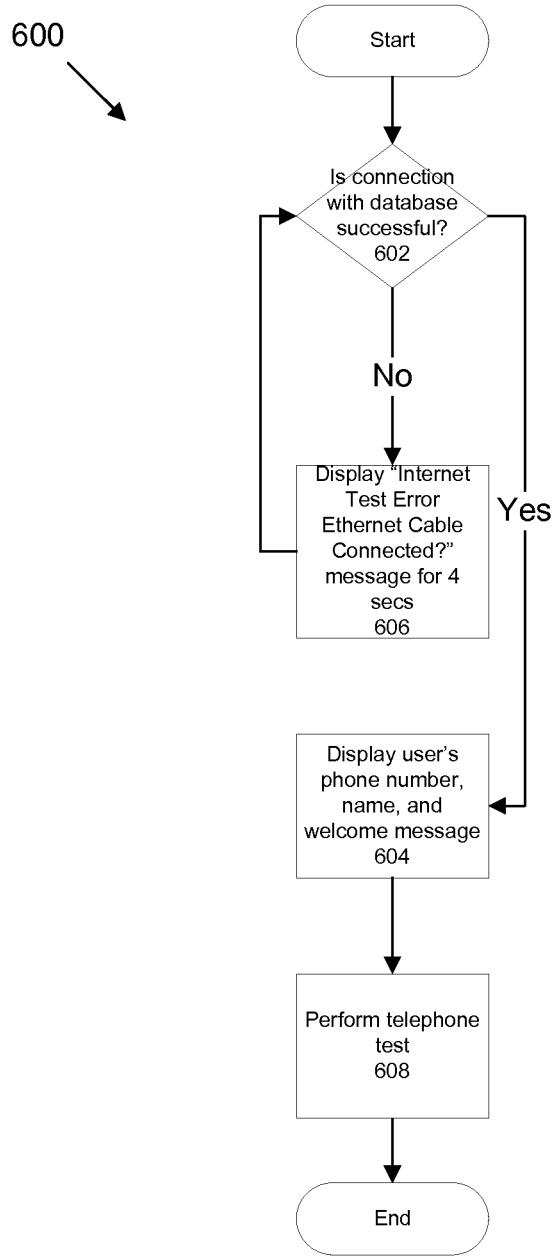
FIG. 6 depicts a flowchart of a method for performing the Internet test in accordance with one embodiment of the present disclosure.

After performing the connection test with device 102, display 300 will perform an Internet test via device 102 to determine if communications with CNAM database 116 or other database 118 for calling party information is successful. Referring to FIG. 6, a flowchart of a method for performing the Internet test is depicted in accordance with one embodiment of the present disclosure. Process 600 begins at step 602 to determine if connection with the CNAM database 116 or other database 118 is successful.

If the connection is successful, process 600 continues to step 604 to display the user's phone number, name, and a welcome message. More details regarding displaying the user's phone number, name, and welcome message are discussed with reference to FIG. 12A below. In one embodiment, a display of the phone number, name, and welcome message alternate every two seconds with a display of the date, time, and remaining message segments. Process 600 then terminates at step 608 to continue to the telephone test. More details regarding displaying the date, time, and remaining welcome message are discussed with reference to FIG. 12B below.

However, if the connection is unsuccessful, process 600 continues to step 606 to display an "Internet Test Error Ethernet Cable Connected?" message on the LCD display for at least four seconds. More details regarding displaying "Internet Test Error Ethernet Cable Connected?" message are discussed with reference to FIG. 12C below. Process 600 then returns to step 602 after four seconds to retry the connection and determine if the connection is successful.

Figure 7:
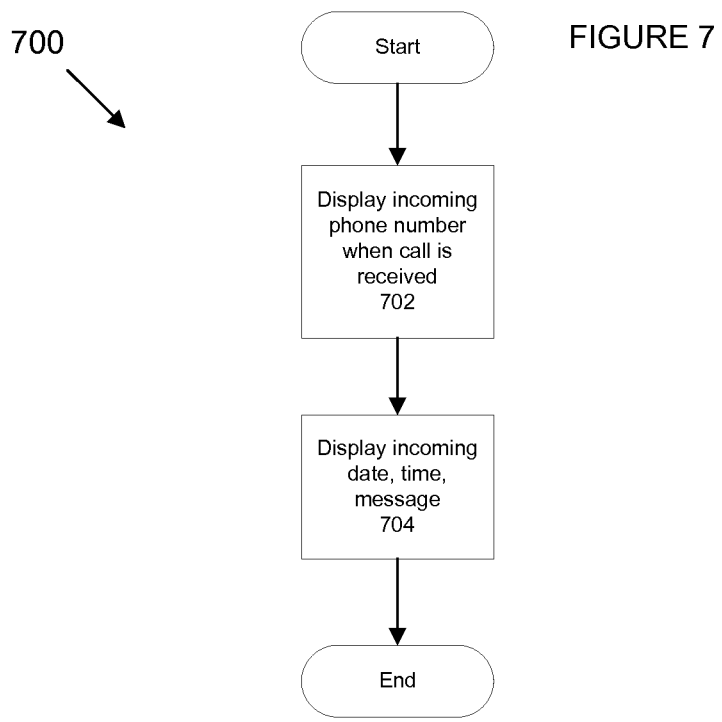
FIG. 7 depicts a flowchart of a method for providing real-time information to called parties on the LCD display in accordance with one embodiment of the present disclosure.

In general, the information last displayed on the LCD remains on the display. Referring to FIG. 7, a flowchart of a method for providing real-time information to called parties on the LCD display is depicted in accordance with one embodiment of the present disclosure. Process 700 begins at step 702 to display an incoming telephone number when an incoming call is received. More details regarding displaying the incoming phone number are discussed with reference to FIG. 13A below.

Next, process 700 continues to step 704 to display retrieved calling party information, including date, time, and message information. More details regarding displaying calling party information are discussed with reference to FIG. 13B below. In one embodiment, the incoming phone number, name, and message alternate every two seconds with the date, time, and remaining message segments. Process 700 then terminates. More details regarding displaying the date, time, and remaining message segments are discussed with reference to FIG. 13C below.

Figure 8:
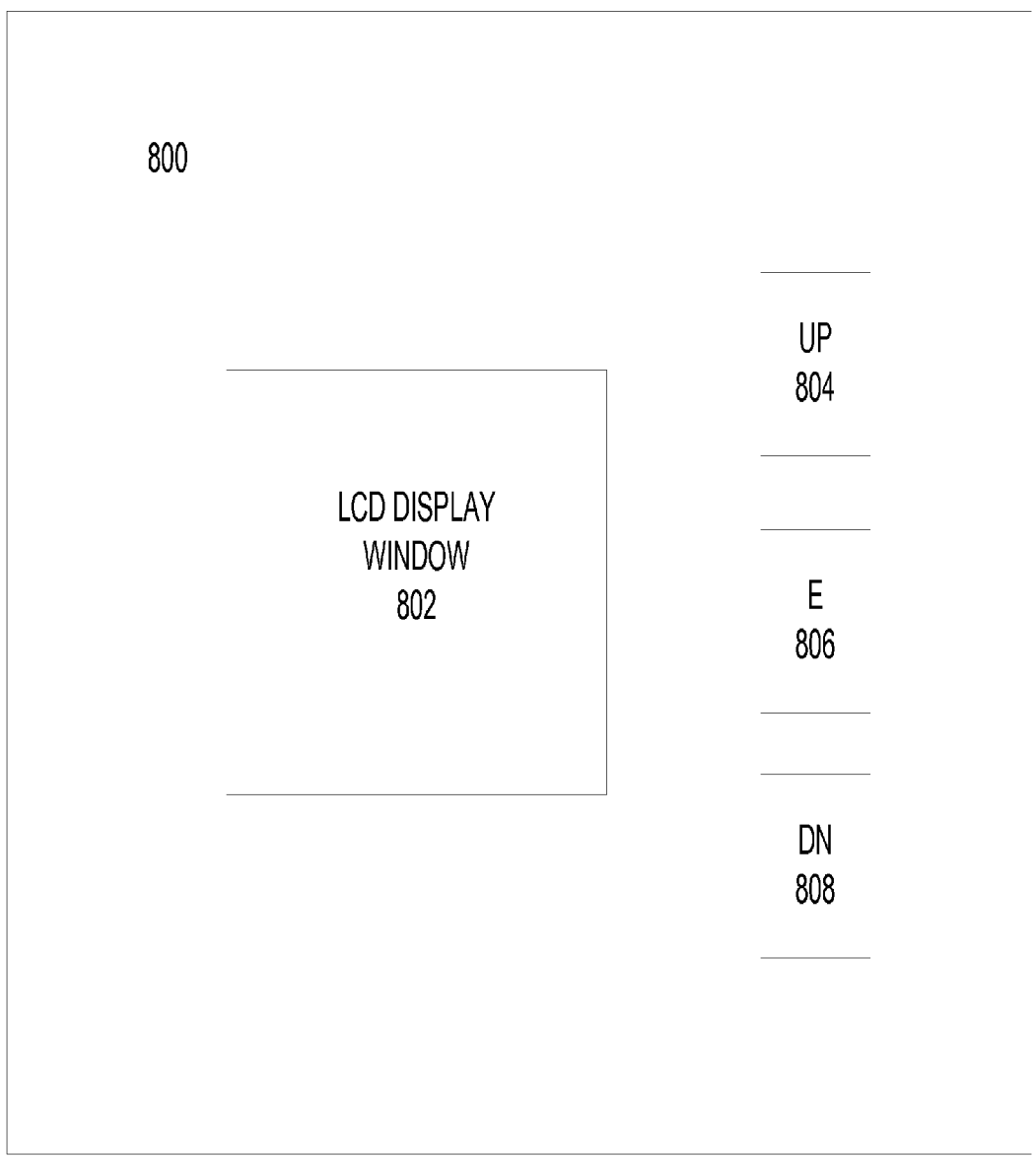
FIG. 8 depicts a diagram of exemplary implementation of the user interface of display 300 in accordance with one embodiment of the present disclosure.

Each incoming message in display 300 is stored in a non-volatile circular buffer. When the buffer is full, the oldest message is replaced with the newest message. Referring to FIG. 8, a diagram of exemplary implementation of a user interface of display 300 is depicted in accordance with one embodiment of the present disclosure. User interface 800 comprises an LCD display window 802, a "UP" key 804, a "E" key 806, and a "DN" key 808.

The "UP" key 804 may be used to set up the display 300 as described in FIG. 4 and perform connection test as described in FIG. 5. When messages are displayed in LCD display window 802, "UP" key 804 scrolls from the current message to a newer or previously displayed message. The display of messages will stop on the newest message. A newest message is a message that is received most recently by display 30.

The "DN" key 808 may also be used to perform setup of the display 300 as described in FIG. 4 and perform connection test as described in FIG. 5. When messages are displayed in LCD display window 802, "DN" key 808 scrolls from the current message to an older or a next-to-be-displayed message. The display of messages will stop on the oldest message. An oldest message is a message that is received earliest in time by display 300.

The "E" key 806 may also be used to perform setup of the display 300 as described in FIG. 4 and perform connection test as described in FIG. 5. The "E" key 806 may also be used to delete the message currently displayed in the LCD display window 902. If the "E" key 806 is depressed for three seconds or more, all of the messages stored in the buffer are deleted.

When viewing a stored message, LCD display window 802 will alternate every two seconds between a display of incoming phone number, name, and message and a display of date, time, and remaining message segment. However, LCD display 802 also provides a sleep mode for power saving. If no key is depressed or no call is received by display 300 within 30 seconds, LCD display window 802 shows only the first screen with the newest message and no alternative of displays will be performed. In this way, LCD display window 802 will enter sleep mode and wake up every second to detect an incoming call.

Figure 9:
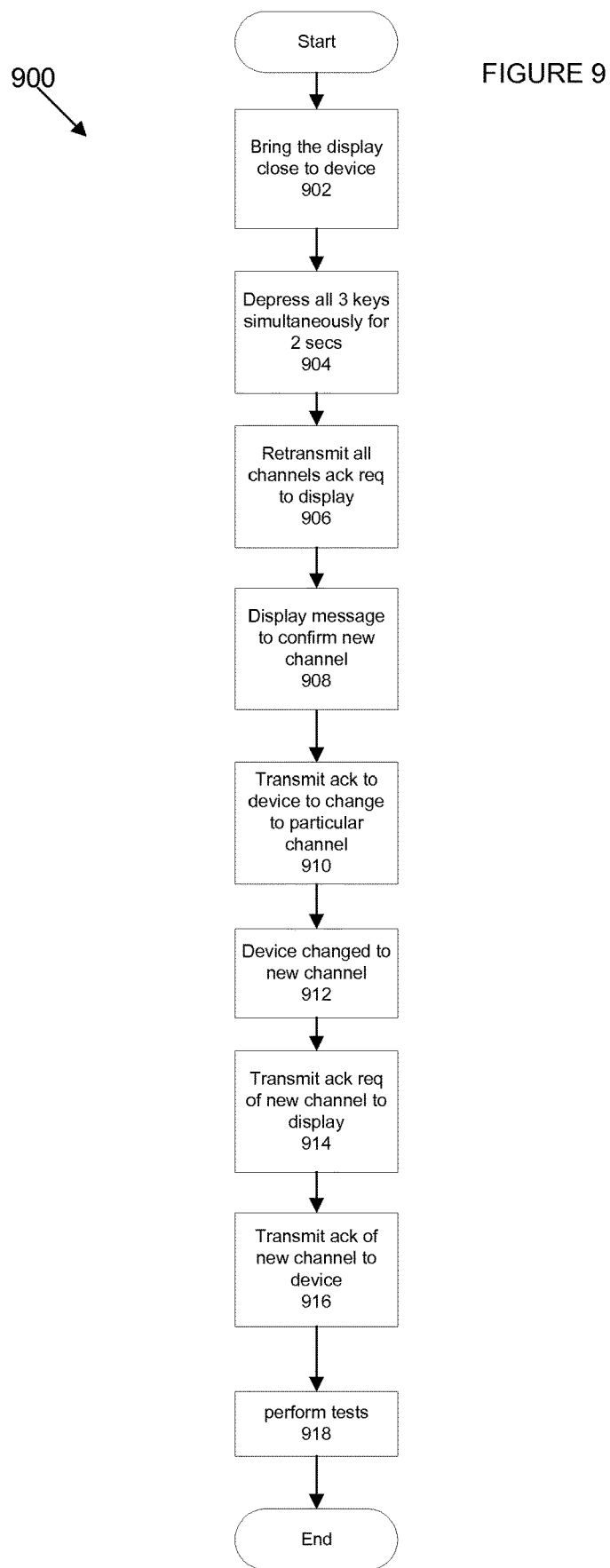
FIG. 9 depicts a flowchart of a process for changing radio channel in accordance with one embodiment of the present disclosure.

During operation of display 300, channel interference may be experienced. In the event of channel interference, the radio channel may be changed. Referring to FIG. 9, a flowchart of a process for changing radio channel is depicted in accordance with one embodiment of the present disclosure. In this example, process 900 begins at step 902 to place the display 300 within proximity of device 102. Once the display is placed within proximity of device 102, any external interference should be overcome.

Next, process 900 continues to step 904 to depress all three keys of the display 300 simultaneously for at least two seconds. The depressing of all keys causes a message to be displayed on the LCD display to notify the user to unplug and re-plug the power to device 102 in order to change radio channels. The device 102 cycles its power within 30 seconds when the power receptacle is unplugged and re-plugged to its power supply. More details regarding displaying a message notifying the user to unplug and re-plug the power to device 102 are discussed with reference to FIG. 12A below.

Upon power up, process 900 continues to 906 to retransmit all channels starting with the current channel and an acknowledgement request to device 102. Once the acknowledgement request is received, process 900 continues to step 908 to display a message prompting the user to enter the new channel. More details regarding displaying a message prompting the user to enter a new channel are discussed with reference to FIG. 14B below. Upon entering the new channel, process 900 continues to step 910 to transmit an acknowledgement with a request for the device to change to the particular channel.

Process 900 then continues to step 912 to change the channel of the device 102 to the new channel specified in the acknowledgement. Process 900 then continues to step 914 to transmit an acknowledgement request of the newly changed channel to the display. Upon receiving the acknowledgement request from the device, the Process 900 continues to step 916 to transmit acknowledgement of the new channel to the device 102. Process 900 then terminates at step 918 to perform connection test and Internet test as described previously.

Figure 10A:
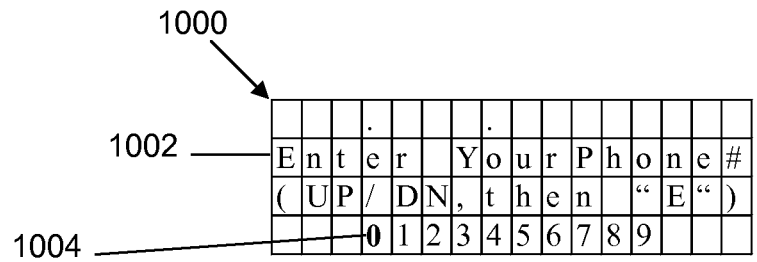
FIG. 10A depicts a diagram illustrating entering a phone number in accordance with one embodiment of the present disclosure.

Referring to FIG. 10A, a diagram illustrating entering a phone number is depicted in accordance with one embodiment of the present disclosure. As shown in LCD display 1000, a message 1002 is displayed prompting the user to enter a 10-digit phone number. First, the user may select a number using the "UP" or "DN" key. By depressing "UP" key, the previous number in numerical sequence 1004 will be selected. By depressing "DN" key, the next number in numerical sequence 1004 will be selected. After each number is selected, the user may enter the selection by depressing the "E" key.

Figure 10B:
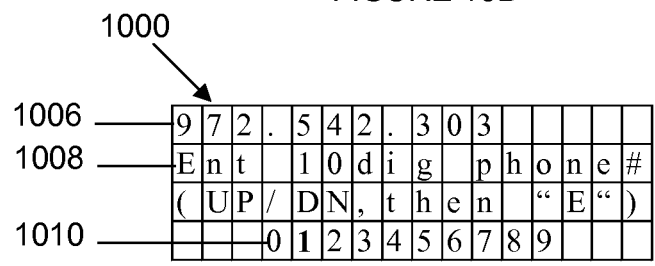
FIG. 10B depicts a diagram illustrating entering the $10^{th}$ digit of a phone number in accordance with one embodiment of the present disclosure.

Referring to FIG. 10B, a diagram illustrating entering the $10^{th}$ digit of a phone number is depicted in accordance with one embodiment of the present disclosure. After 9 digits of phone number 1006 have been selected, a message 1008 is displayed prompting the user to enter the $10^{th}$ digit using the "UP" or "DN" key. By depressing "UP" key, the previous number in numerical sequence 1010 will be selected. By depressing "DN" key, the next number in numerical sequence 1010 will be selected. After the $10^{th}$ number is selected, the user may enter it by depressing the "E" key.

Figure 10C:
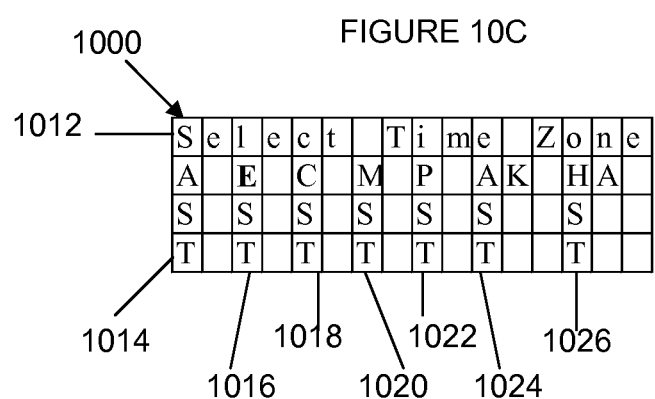
FIG. 10C depicts a diagram illustrating entering a time zone in accordance with one embodiment of the present disclosure.

Referring to FIG. 10C, a diagram illustrating entering a time zone is depicted in accordance with one embodiment of the present disclosure. After the phone number is entered, a message 1012 is displayed prompting the user to select a time zone from one of the following: Atlantic Standard Time (AST) 1014, Eastern Standard Time (EST) 1016, Central Standard Time (CST) 1018, Mountain Standard Time (MST) 1020, Pacific Standard Time (PST) 1022, Alaska Standard Time (AKST) 1024, and Hawaii Standard Time (HAST) 1026. By depressing the "UP" key, the previous time zone will be selected. By depressing the "DN" key, the next time zone will be selected. After the time zone is selected, the user may enter it by depressing the "E" key.

Figure 10D:
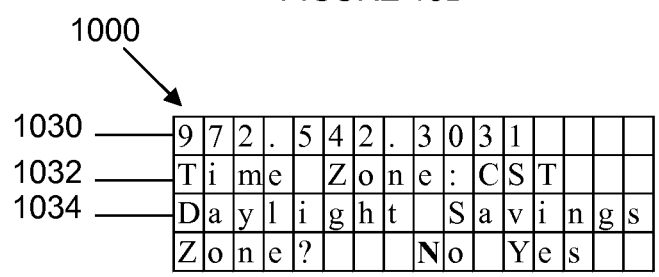
FIG. 10D depicts a diagram illustrating entering daylight savings zone in accordance with one embodiment of the present disclosure.

Referring to FIG. 10D, a diagram illustrating entering daylight savings zone is depicted in accordance with one embodiment of the present disclosure. After the time zone is entered, the user's phone number 1030 and the selected time zone 1032 are displayed on LCD display 1000. In addition, a message 1034 is displayed prompting the user to enter daylight savings zone if the area uses Daylight Savings Time. By depressing the "UP" key, a "No" will be selected. By depressing the "DN" key, a "Yes" will be selected. After the selection is made, the user may enter it by depressing the "E" key.

Figure 10E:
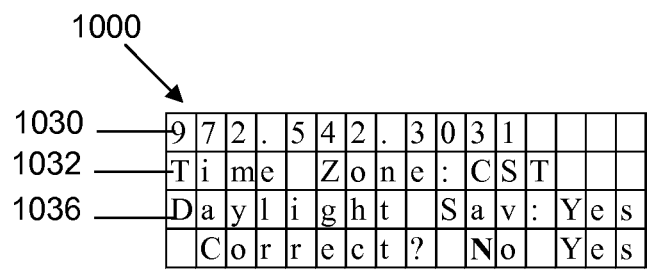
FIG. 10E depicts a diagram illustrating confirming a daylight savings zone in accordance with one embodiment of the present disclosure.

Referring to FIG. 10E, a diagram illustrating confirming a daylight savings zone is depicted in accordance with one embodiment of the present disclosure. After the daylight savings zone is entered, the user's phone number 1030 and the selected time zone 1032 are displayed on LCD display 1000. In this example, a Central Standard Time (CST) is entered. In addition, a message 1036 is displayed prompting the user to confirm the daylight savings zone entered. By depressing the "UP" key, a "No" will be selected. By depressing the "DN" key, a "Yes" will be selected. After the selection is made, the user may confirm it by depressing the "E" key.

Figure 11A:
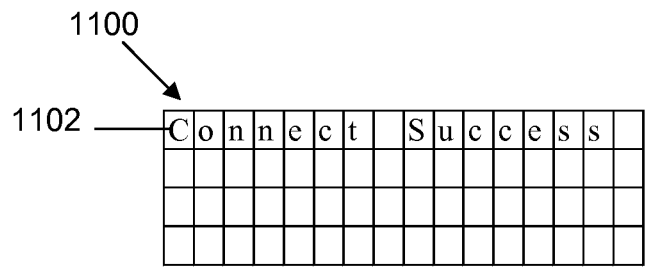
FIG. 11A depicts a diagram illustrating displaying a "Connect Success" message in accordance with one embodiment of the present disclosure.

Referring to FIG. 11A, a diagram illustrating displaying a "Connect Success" message is depicted in accordance with one embodiment of the present disclosure. After the daylight savings zone is confirmed, a connection test with the device 102 is performed. A "Connect Success" message 1102 is displayed on LCD display 1100 if the connection test is performed successfully.

Figure 11B:
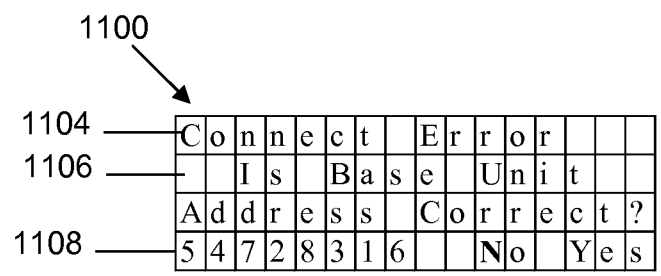
FIG. 11B depicts a diagram illustrating displaying a "Connect Error" message and confirming radio address in accordance with one embodiment of the present disclosure.

Referring to FIG. 11B, a diagram illustrating displaying a "Connect Error" message and confirming radio address is depicted in accordance with one embodiment of the present disclosure. If the connection test is unsuccessful, a "Connect Error" message 1104 is displayed on LCD display 1100 to notify user that the connection is unsuccessful. In addition, a message 1106 is displayed prompting the user to confirm the 8-digit radio address 1108 of device 102. By depressing the "UP" key, a "No" will be selected. By depressing the "DN" key, a "Yes" will be selected. After the selection is made, the user may confirm it by depressing the "E" key.

Figure 11C:
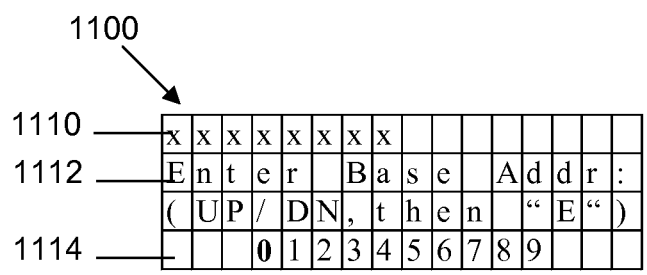
FIG. 11C depicts a diagram illustrating entering a radio address of device in accordance with one embodiment of the present disclosure.

Referring to FIG. 11C, a diagram illustrating entering a radio address of device is depicted in accordance with one embodiment of the present disclosure. The 8-digit radio address 1110 is displayed on LCD display 1100. A message 1112 is displayed prompting the user to enter a base radio address by using the "UP" or "DN" key. By depressing the "UP" key, the previous number in numerical sequence 1114 will be selected. By depressing the "DN" key, the next number in numerical sequence 1114 will be selected. After each number is selected, the user may enter the selection by depressing the "E" key.

Figure 11D:
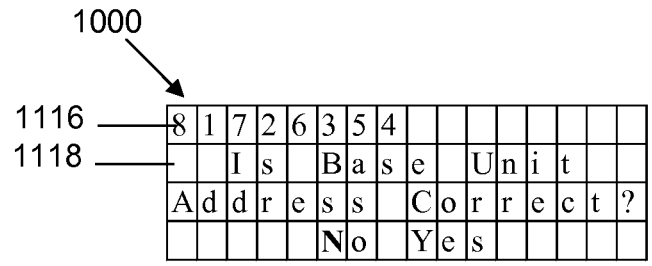
FIG. 11D depicts a diagram illustrating confirming the radio address entry in accordance with one embodiment of the present disclosure.

Referring to FIG. 11D, a diagram illustrating confirming the radio address entry is depicted in accordance with one embodiment of the present disclosure. After 8 digits of radio address 1116 have been selected, a message 1118 is displayed prompting the user to confirm the entry of radio address 1116 using the "UP" or "DN" key. Message 1118 confirms entry of the radio address 1116 by asking the user "Is Base Unit Address Correct?" By depressing the "UP" key, a "No" will be selected. By depressing the "DN" key, a "Yes" will be selected. After the selection is made, the user may confirm it by depressing the "E" key.

Figure 11E:
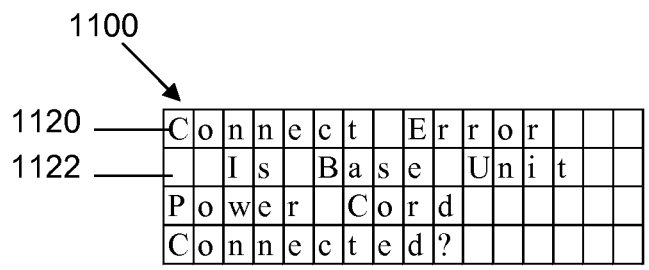
FIG. 11E depicts a diagram illustrating displaying "Connect Error" message in accordance with one embodiment of the present disclosure.

Referring to FIG. 11E, a diagram illustrating displaying "Connect Error" message is depicted in accordance with one embodiment of the present disclosure. If the connection test is unsuccessful, a message 1120 is displayed notifying the user that the connection test is performed unsuccessfully. In addition, a "Is base unit power cord connected?" message 1122 is displayed prompting the user to check the power cord of the device.

Figure 11F:
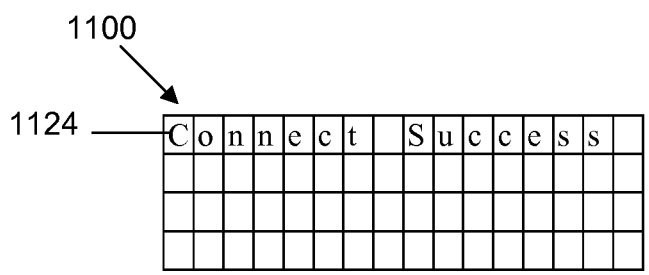
FIG. 11F depicts a diagram illustrating displaying a "Connect Success" message in accordance with one embodiment of the present disclosure.

Referring to FIG. 11F, a diagram illustrating displaying a "Connect Success" message is depicted in accordance with one embodiment of the present disclosure. A "Connect Success" message 1124 is displayed on LCD display 1100 if the connection test is performed successfully.

Figure 12A:
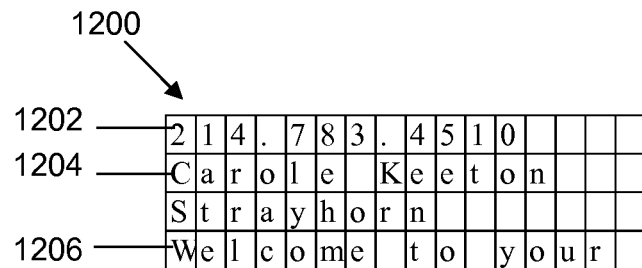
FIG. 12A depicts a diagram illustrating displaying the user's phone number, name, and welcome message in accordance with one embodiment of the present disclosure.

Referring to FIG. 12A, a diagram illustrating displaying the user's phone number, name, and welcome message is depicted in accordance with one embodiment of the present disclosure. If communication with the CNAM database or other database is successful, the user's phone number 1202 is displayed in LCD display 1200. The user's name 1204 is also displayed in LCD display 1200. Part of a welcome message 1206 is further displayed on LCD display 120 to welcome the new user.

Figure 12B:
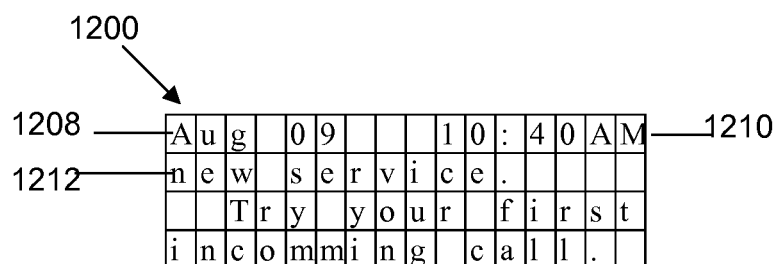
FIG. 12B depicts a diagram illustrating displaying the date, time, and remaining welcome message in accordance with one embodiment of the present disclosure.

Referring to FIG. 12B, a diagram illustrating displaying the date, time, and remaining welcome message is depicted in accordance with one embodiment of the present disclosure. The phone number 1202, name 1204 and welcome message 1206 alternate every two seconds with the date 1208, time 1210, and remaining message segment 1212.

Figure 12C:
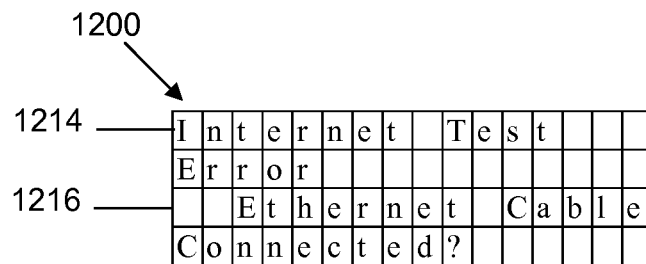
FIG. 12C depicts a diagram illustrating displaying a "Internet Test Error" message in accordance with one embodiment of the present disclosure.

Referring to FIG. 12C, a diagram illustrating displaying a "Internet Test Error" message is depicted in accordance with one embodiment of the present disclosure. If communication with the CNAM database or other database is unsuccessful, a "Internet Test Error" message 1214 is displayed in LCD display 1200 to notify the user that the Internet test is unsuccessful. In addition, a "Ethernet Cable Connected?" message 1216 is displayed on LCD display 1200 to remind the user to check Ethernet cable connection.

Figure 13A:
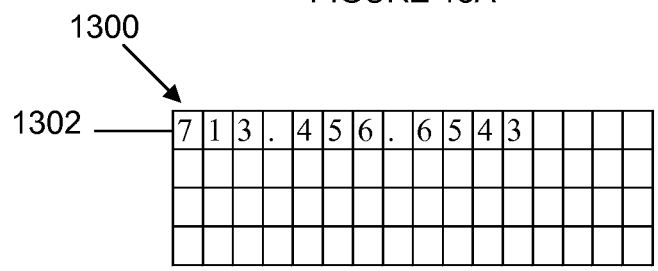
FIG. 13A depicts a diagram illustrating displaying the incoming phone number in accordance with one embodiment of the present disclosure.

Referring to FIG. 13A, a diagram illustrating displaying the incoming phone number is depicted in accordance with one embodiment of the present disclosure. In operation, when an incoming call is received at display 300, the phone number 1302 of the incoming call is displayed on LCD display 1300.

Figure 13B:
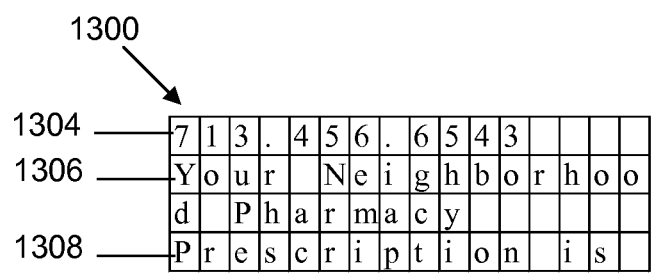
FIG. 13B depicts a diagram illustrating displaying calling party information in accordance with one embodiment of the present disclosure.

Referring to FIG. 13B, a diagram illustrating displaying calling party information is depicted in accordance with one embodiment of the present disclosure. After calling party information is retrieved, the information is displayed on LCD display 300. The information includes the calling party's phone number 1304, calling party name 1306, and part of a message intended for called party 1308.

Figure 13C:
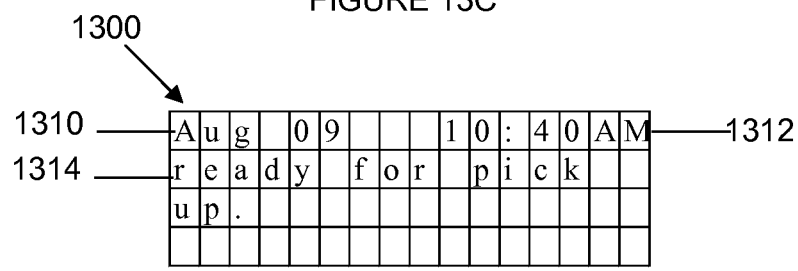
FIG. 13C depicts a diagram illustrating displaying the date, time, and remaining message intended for the called party in accordance with one embodiment of the present disclosure.

Referring to FIG. 13C, a diagram illustrating displaying the date, time, and remaining message intended for the called party is depicted in accordance with one embodiment of the present disclosure. The phone number 1304, calling party name 1306 and message intended for called party 1208 alternate every two seconds with the date 1310, time 1312, and remaining message segment intended for called party 1314.

Referring to FIG. 14A, a diagram illustrating displaying a message notifying the user to unplug and re-plug the power to device 102 is depicted in accordance with one embodiment of the present disclosure. After depressing all keys simultaneously for two seconds, a "Unplug and re-plug power to Base Unit to change channels" message 1402 is displayed for at least six seconds to notify the user to cycle power in order to change radio channel.

Referring to FIG. 14B, a diagram illustrating entering a new channel is depicted in accordance with one embodiment of the present disclosure. Upon power up, a message 1404 is displayed showing the user the current channel number. The message 1404 also prompts the user to enter a new channel number using the "UP" and "DN" keys. By depressing the "UP" key, the previous number or character in alphanumeric sequence 1406 will be selected. By depressing the "DN" key, the next number or character in alphanumerical sequence 1406 will be selected. After the selection is made, the user may confirm it by depressing the "E" key.

In summary, the present disclosure provides a system and method for providing additional information to called parties. In one embodiment, the system comprises a liquid crystal display operable to display at least one alphanumeric character, a "UP" key, a "DN" key, and a "E" key. A setup of the display unit may be initiated upon a depression of the "UP" key and "DN" key simultaneously for at least three seconds. In addition, a phone number of the display unit may be configured upon a depression of at least one of the "UP" and "DN" keys to select at least one number in a numerical sequence displayed on the liquid crystal display, and the "E" key to enter the at least one number. A radio address of the base unit device may be configured upon a depression of at least one of the UP" and "DN" keys to select at least one number in a numerical sequence displayed on the liquid crystal display, and the "E" key to enter the at least one number. The liquid crystal display is operable to display a phone number of an incoming call, a name of a calling party, and the additional information comprising a date, a time, and a message. The display of the phone number, the name, and the message is alternated with a display of the date, the time, and a remaining portion of the message for at least every two seconds.

Although an exemplary embodiment of the system and method of the present disclosure has been illustrated in the accompanied drawings and described in the foregoing detailed description, it will be understood that the disclosure is not limited to the embodiments disclosed, but is capable of numerous rearrangements, modifications, and substitutions without departing from the spirit and scope of the present disclosure as set forth and defined by the following claims. For example, a greater or lesser numbers of elements, modules, hardware, software, and/or firmware can be used to provide additional information to called parties without departing from the spirit and scope of the present disclosure. Also, the additional information can be sent via at least one of a data network, the Internet, an Internet Protocol network, a wireless source, and a wired source and via a plurality of protocols. For example, the wireless connection between device 102 and other called party devices may be established via wireless protocols, such as TDMA, CDMA, 802.11b, 802.11g, or other types of wireless protocols.

What is claimed is:

1. A system, comprising:
a base unit device that sends information to a called party, the base unit comprises a microprocessor and a transceiver; and
a display unit communicably coupled to the base unit that displays the information to the called party;
wherein the microprocessor is programmed to:
receive a calling party identifier;
verify a called party name and a zip code, and in response:
retrieve a calling party name and a calling party message that is intended for the called party from a database via the identifier; and
provide the information comprising the calling party name and the calling party message to the display unit via the transceiver.

2. The system of claim 1, wherein the microprocessor provides the identifier as a lookup query to the database.

3. The system of claim 2, wherein the microprocessor sends the lookup query to an Ethernet interface for delivery to an Ethernet port.

4. The system of claim 3, wherein the Ethernet interface forwards the query to the Ethernet port via an Ethernet interface circuitry for delivery to the database.

5. The system of claim 1, wherein the Ethernet port receives the information retrieved from the database.

6. The system of claim 5, wherein the Ethernet port sends the information to the Ethernet interface via an Ethernet interface circuitry for delivery to the microprocessor.

7. The system of claim 1, wherein the microprocessor forwards the information to a caller ID decoder.

8. The system of claim 7, wherein the caller ID decoder encodes the information into a format utilized by the display unit.

9. The system of claim 1, wherein the microprocessor forwards the information to the transceiver for delivery to a first wireless antenna.

10. The system of claim 9, wherein the transceiver forwards the information to the first wireless antenna via an antenna interface circuitry for delivery to the display unit.

11. The system of claim 1, wherein the display device comprises a second wireless antenna.

12. The system of claim 11, wherein the second wireless antenna receives the information and forwards the information to one other transceiver via an antenna interface circuitry.

13. The system of claim 12, wherein the other transceiver forwards the information to the display via an interface circuitry.

14. The system of claim 1, wherein the display unit is configured by at least one configuration of a set of keys.

15. A system, comprising:
a display unit that displays information received from a base unit device to a called party;
wherein the information comprises a calling party name and a calling party message that is intended for the called party that have been retrieved from a database by the base unit device via a calling party identifier in response to receipt of the calling party identifier, the calling party name and the calling party message retrieved in response to the display unit verifies a called party name and a zip code.

16. The system of claim 15, wherein the display unit displays a phone number of an incoming call and a name of a calling party.

17. The system of claim 15, wherein the information comprises a date, a time, and a message.

18. The system of claim 16, wherein the display unit alternates a display of the phone number, the name, and the message.

19. The system of claim 17, wherein the display unit alternates a display of the date, the time and a remaining portion of the message.

20. A method, comprising:
displaying information received from a base unit device to a called party;
wherein the information comprises a calling party name and a calling party message that is intended for the called party that have been retrieved from a database by the base unit device via a calling party identifier in response to receipt of the calling party identifier, the calling party name and the calling party message retrieved in response to the base unit device verifies a called party name and a zip code.

* * * * *